April 8, 1952 E. L. McCLEES 2,591,958
ANTIKICKING DEVICE FOR COWS
Filed Feb. 11, 1950 2 SHEETS—SHEET 1

INVENTOR
Ernest L. McClees
BY
ATTORNEYS

INVENTOR
*Ernest L. McClees*

UNITED STATES PATENT OFFICE 2,591,958

ANTIKICKING DEVICE FOR COWS

Ernest L. McClees, Stockton, Calif.

Application February 11, 1950, Serial No. 143,654

6 Claims. (Cl. 119—127)

This invention has for an object the provision of a novel device adapted to be engaged with the rear back leg of a cow to prevent bending of the knee whereby during milking of the cow the latter cannot kick the milk pail or the milker.

Another object of the invention is to provide an anti-kicking device which is readily portable and easily manually operated to effect quick attachment or detachment to or from the leg of a cow; the device being spring-actuated for fast closing so as to minimize the possibility of the cow kicking free of the device when it is being applied.

A further object of the invention is to provide an anti-kicking device, as above, which includes upper and lower leg engaging jaw units extending rearwardly from a bar; there being novel spring actuated, handle released toggle mechanism associated with the jaws operative to close the latter from open, releasably latched position.

Still another object of the invention is to provide an anti-kicking device for cows which is designed for ease and economy of manufacture.

An additional object of the invention is to provide a practical and reliable anti-kicking device for cows, and one which will be exceedingly effective for the purpose for which it is designed.

These objects are accomplished by means of such structure and relative arrangement of parts as will fully appear by a perusal of the following specification and claims.

Figure 1:
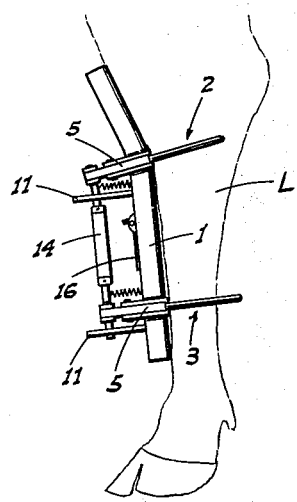
Fig. 1 is a side elevation of the device as in use.

Referring now more particularly to the characters of reference on the drawings, the device comprises an upstanding bar 1 adapted to engage the near rear leg L of a cow, with said bar extending from above to below the knee. The upper portion of the bar 1 is canted forwardly in order to attain substantially symmetrical engagement with the forward part of the cow's leg.

A pair of vertically spaced jaw units project rearwardly from the bar 1, the upper and lower jaw units being indicated generally at 2 and 3 respectively. The lower jaw unit 3 is substantially horizontal, whereas the upper jaw unit 2 extends at an upward and rearward incline in order to best engage the cow's leg L above the knee. As shown, the upper jaw unit 2 extends from the bar 1 at the lower end of the forwardly canted upper portion of the latter.

Each jaw unit comprises cooperating arcuate jaws 4 which face each other, and each jaw includes a substantially straight shank 5; said shanks 5 projecting, on opposite sides of the bar 1, to a termination ahead thereof.

Intermediate their ends the shanks 5 extend between mounting plates 6 fixed to the bar 1 and extending laterally from opposite sides thereof. Each shank 5 is pivoted, as at 7, between the adjacent mounting plates 6 for lateral swinging motion of the jaw 4.

At their forward ends the shanks 5 of each jaw unit are pivotally connected, as at 8, to opposite ends of a toggle linkage 9.

A post 10 is disposed in front of the bar 1 and extends between the toggle linkages 9, forming the central axis of both thereof.

Figure 3:
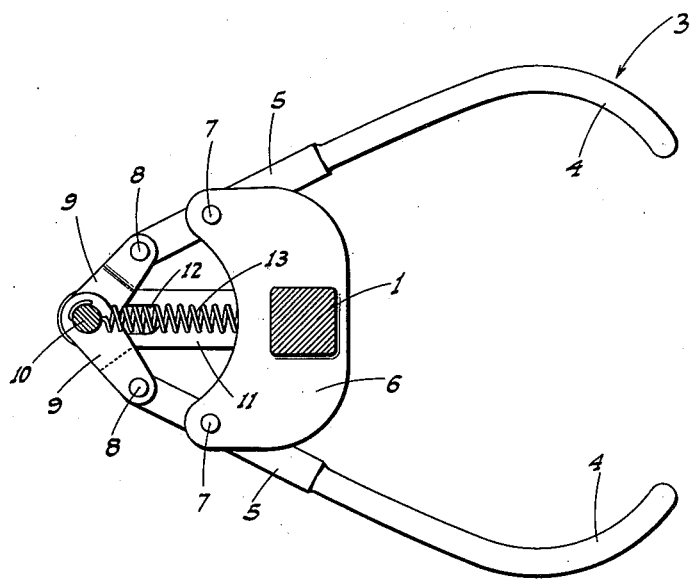
Fig. 3 is a sectional plan on line 3—3 of Fig. 2, with the lowermost jaw unit in open position.
Figure 4:
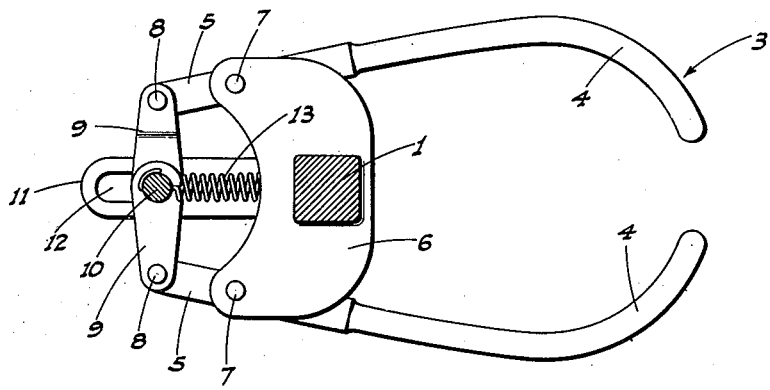
Fig. 4 is a similar view, but shows said lowermost jaw unit in closed position.

A rigid guide arm 11 is fixed to, and projects forwardly from, the bar 1 adjacent each toggle linkage 9, and each guide arm is longitudinally slotted, as at 12, with the post 10 extending through said slot in guided relation. As the slots 12 are elongated, rearward motion of the post 10 from an advanced position, as in Fig. 3 with the jaw units open, to a retracted position as in Fig. 4, causes the toggle linkages 9 to close said jaw units.

Tension springs 13, connected between the bar 1 and post 10 adjacent the linkages 9, act to retract the post 10 so that there is a tendency for the jaw units 2 and 3 to close.

Figure 2:
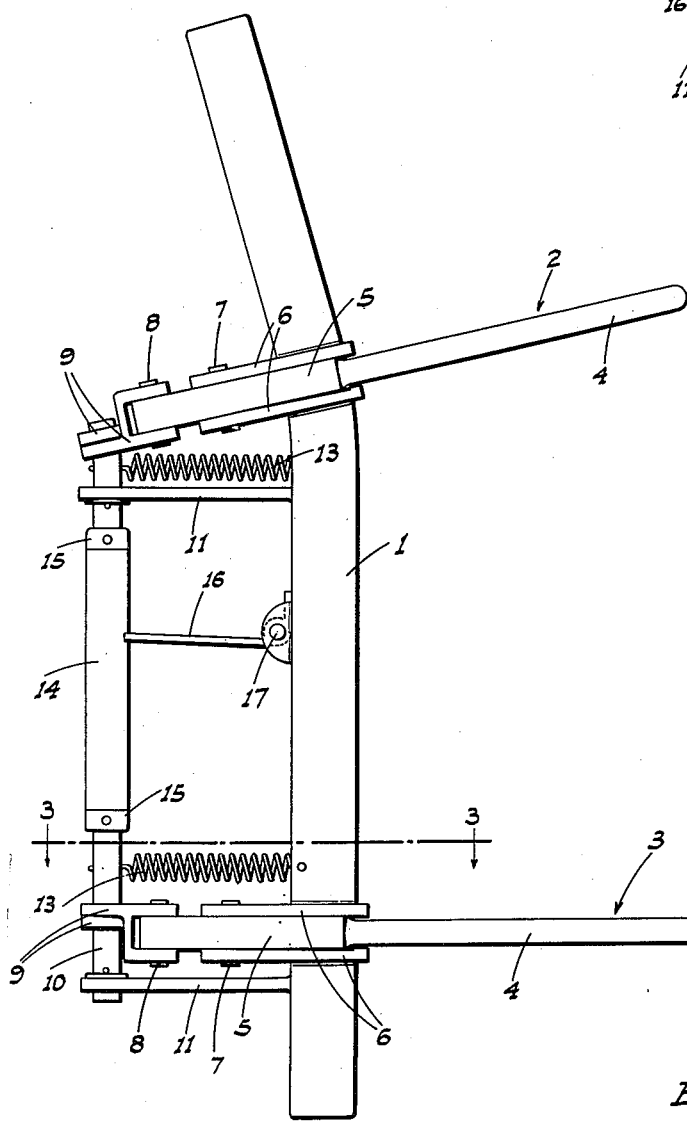
Fig. 2 is an enlarged side elevation of the device, detached.

The post 10 is fitted, centrally of its ends, with a sleeve handle 14 held in place between collars 15, and a swing latch 16 is pivoted, as at 17, to the bar 1, at the front of the latter, for swinging motion between a released position, as in Fig. 1, to an engaged or operative position, as in Fig. 2.

When the above described device is in use, the swing latch 16 is first swung to a horizontal position, engaging the sleeve handle 14 and urging the post 10 forwardly, whereby to open the jaw units 2 and 3 against the tension of the springs 13.

Thereafter, with the device hand-supported from the sleeve handle 14, such device is placed against the front of the cow's leg L in proper position and then the latch 16 is swung downwardly by one finger. When this occurs the springs 13 snap the post 10 rearwardly of the slots 12, with the result that the jaw units 2 and 3 quick-close on the cow's leg, with the bar 1 in engagement, splint-like, with the front of the latter from above to below the knee. See Fig. 1. This effectively prevents the cow from kicking forwardly, as is desirable to prevent upsetting of the milk pail or injuring the milker.

To release the device from the cow's leg, it is only necessary that the latch 16 be swung into advancing engagement with the sleeve handle 14, to the position of Fig. 2, whereupon the jaw units 2 and 3 are opened.

From the foregoing description it will be readily seen that there has been produced such a device as substantially fulfills the objects of the invention, as set forth herein.

While this specification sets forth in detail the present and preferred construction of the device, still in practice such deviations from such detail may be restorted to as do not form a departure from the spirit of the invention, as defined by the appended claims.

Having thus described the invention, the following is claimed as new and useful, and upon which Letters Patent are desired:

1. An anti-kicking device for cows, comprising an upstanding bar adapted to engage the rear leg of a cow from above to below the knee, a pair of vertically spaced jaw units mounted in connection with the bar and projecting rearward for leg engagement above and below the knee, a single control means between the bar and both jaw units and including a spring tending to cause the jaws to close, and a manually releasable latch between the bar and said means to hold the jaws open and the spring loaded.

2. An anti-kicking device for cows, comprising an upstanding bar adapted to engage the rear leg of a cow from above to below the knee, a pair of vertically spaced jaw units projecting rearward from the bar for leg engagement above and below the knee, each jaw unit including cooperating laterally swingable jaws having shanks pivoted in connection with the bar and extending ahead thereof, toggle linkage connecting the forward ends of said shanks, spring means acting on said linkage in a direction tending to cause the latter to close the jaws, and releasably latched means operative to hold said linkage with the jaws open.

3. An anti-kicking device for cows, comprising an upstanding bar adapted to engage the rear leg of a cow from above to below the knee, a pair of vertically spaced jaw units projecting rearward from the bar for leg engagement above and below the knee, each jaw unit including cooperating laterally swingable jaws having shanks pivoted in connection with the bar and extending ahead thereof, toggle linkage connecting the forward ends of said shanks, spring means acting on said linkage in a direction tending to cause the latter to close the jaws, and releasably latched means operative to hold said linkage with the jaws open; said last named means including a post connected between and forming the central axis of said linkages, and a latch releasibly engaged between the bar and post.

4. An anti-kicking device for cows, comprising an upstanding bar adapted to engage the rear leg of a cow from above to below the knee, a pair of vertically spaced jaw units projecting rearward from the bar for leg engagement above and below the knee, each jaw unit including cooperating laterally swingable jaws having shanks pivoted in connection with the bar and extending ahead thereof, toggle linkage connecting the forward ends of said shanks, a post connected between and forming the central axis of said linkages, vertically spaced arms projecting forwardly from the bar, the arms having longitudinally elongated guide slots through which the post extends, and a releasable latch adapted to be engaged between the bar and post.

5. An anti-kicking device for cows, comprising an upstanding bar adapted to engage the rear leg of a cow from above to below the knee, a pair of vertically spaced jaw units projecting rearward from the bar for leg engagement above and below the knee, each jaw unit including cooperating laterally swingable jaws having shanks pivoted in connection with the bar and extending ahead thereof, toggle linkage connecting the forward ends of said shanks, a post connected between and forming the central axis of said linkages, rigid vertically spaced arms projecting forward from the post adjacent corresponding linkages, said arms having longitudinal guide slots through which the post extends, tension springs connected between the post and bar adjacent said corresponding linkages, and a swing latch adapted to be releasably engaged between the bar and post between said arms.

6. An anti-kicking device for cows, comprising an upstanding bar adapted to engage the rear leg of a cow from above to below the knee, a pair of vertically spaced jaw units projecting rearward from the bar for leg engagement above and below the knee, each jaw unit including cooperating laterally swingable jaws, vertically spaced mounting plates on the bar extending laterally to the sides thereof, the cooperating jaws of each pair including shanks pivoted to opposite sides of the corresponding mounting plate and extending ahead of the bar, toggle linkage connecting the forward ends of said shanks, a post connected between and forming the central axis of said linkages, rigid vertically spaced arms projecting forward from the post adjacent corresponding linkages, said arms having longitudinal guide slots through which the post extends, tension springs connected between the post and bar adjacent said corresponding linkages, and a swing latch adapted to be releasably engaged between the bar and post between said arms.

ERNEST L. McCLEES.

REFERENCES CITED

The following references are of record in the file of this patent:

UNITED STATES PATENTS

| Number | Name | Date |
|---|---|---|
| 753,359 | Casey | Mar. 1, 1904 |
| 1,270,814 | Grove | July 2, 1918 |

FOREIGN PATENTS

| Number | Country | Date |
|---|---|---|
| 219,175 | Germany | Feb. 17, 1910 |